Aug. 26, 1941.   N. ACHS   2,253,882
MECHANICAL MILK COOLER
Filed June 20, 1940
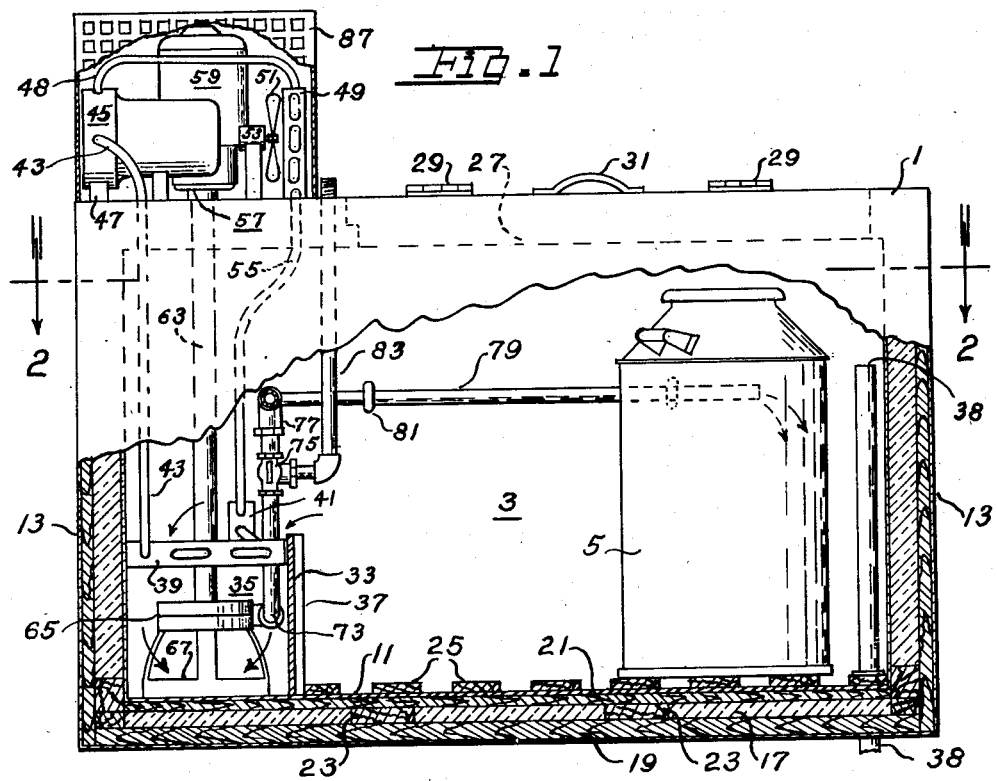
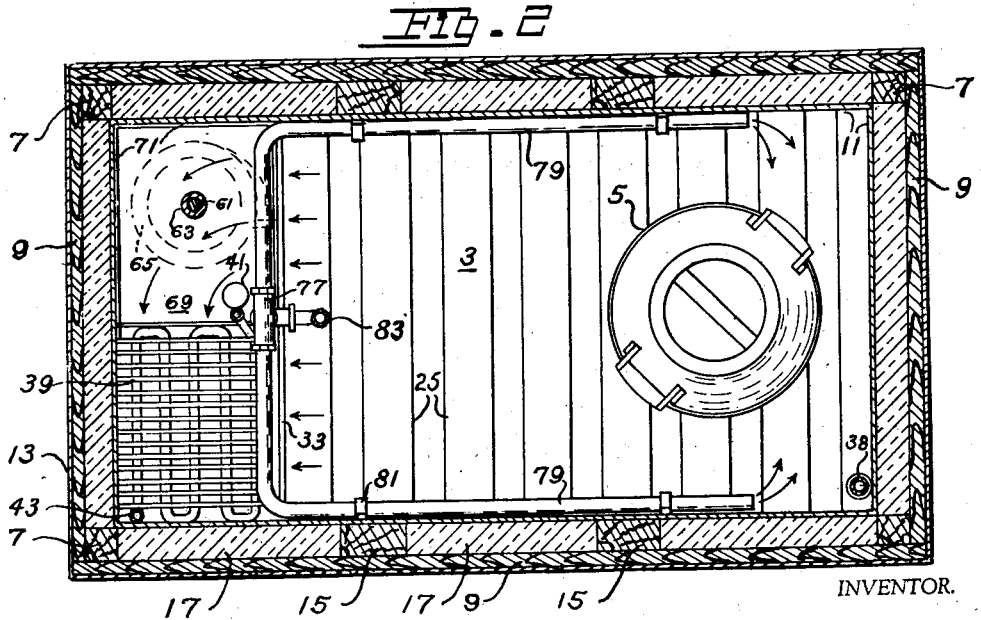
INVENTOR.
Nicholas Achs
BY  F.D.Hicks
HIS ATTORNEY Patented Aug. 26, 1941

2,253,882

UNITED STATES PATENT OFFICE 2,253,882

MECHANICAL MILK COOLER

Nicholas Achs, Detroit, Mich., assignor to Frederick T. Hicks, Detroit, Mich.

Application June 20, 1940, Serial No. 341,401

4 Claims. (Cl. 62—101)

My invention pertains to an improved mechanical cooling apparatus and method of cooling and more particularly to mechanical milk coolers for cooling milk in cans and similar containers.

It is an object of my invention to provide an improved mechanical milk cooler comprising a thermal insulating cabinet enclosing a cooling tank for holding cooling water or other cooling liquid into which milk containers may be conveniently immersed for absorbing the heat therefrom, a refrigerated open-type cooling element, and liquid circulating means in a simple compact unit with the tank and arranged for more efficiently circulating the cooling liquid to and from the cooling tank into intimate heat exchange relation with the refrigerated open-type cooling element, with freedom from congealing on the cooling element.

It is also an object of my invention to provide such a mechanical milk cooler comprising a partition disposed vertically in the cabinet for dividing off a chill chamber, the partition being selected of suitable dimensions and suitably positioned so that the top edge thereof is lower than the lowest level of the cooling water or other liquid in the cooling tank when there are no milk containers therein, a refrigerated open-type cooling element suitably disposed in the chill chamber for passing the cooling liquid therethrough in intimate heat exchanging relation as it flows from the cooling tank over the top of the partition into the chill chamber, and pump means for removing the chilled cooling liquid from the bottom of the chill chamber and delivering it into the cooling tank.

It is a further object of my invention to provide such a mechanical milk cooler wherein the pump means is a motorized sump-type pump mounted upon the cabinet with the motor above the top wall and the pump disposed in the bottom of the chill chamber to be immersed in the chilled cooling liquid flowing down through the cooling element, and conduits extending from the sump pump for delivering the chilled liquid to the remote end of the cooling tank into the upper portion thereof.

Another object of my invention is to provide such a mechanical milk cooler which is conveniently adapted for either cooling milk in cans or similar containers or for supplying chilled cooling liquid for cooling milk directly in counter-flow heat exchangers and similar milk cooling apparatus, or for supplying water under pressure when tap water is not available.

Further objects and advantages are within the scope of my invention such as relate to the arrangement, operation and function of the related elements, to various details of construction and to combinations of parts, elements per se, and to economics of manufacture and to numerous other features as will be apparent from a consideration of the specification in conjunction with the drawing disclosing a form of my invention, in which:

Fig. 1 is a side elevational view of my improved mechanical milk cooler the cabinet being partially broken away and sectioned to show the internal construction and arrangement, and Fig. 2 is a cross sectional view taken on line 2—2 of Fig. 1 and showing a top plan view of the internal arrangement of the milk cooler.

Referring more specifically to the drawing, my mechanical milk cooler comprises a heat insulating cabinet 1 enclosing a cooling tank 3 for receiving milk cans 5 to be immersed in a cooling liquid for absorbing the heat and chilling the milk. For this purpose the heat insulating cabinet may be of any well known construction commonly used for refrigerators, and the like. As shown in Fig. 2, I preferably construct the cabinet of four vertically disposed corner pieces 7 of timber, which may be about two inches square in cross section, and which are covered on the outside and secured together by suitable boards 9 which may be about one inch thick. The walls of the cabinet are covered and closed or sealed by means of sheet metal inside and outside liners 11 and 13 respectively. The liners may be of any suitable sheet metal such as galvanized iron, copper or the like, and if desired the liners may be provided with a layer of vitrified porcelain or similar material. Reinforcing timbers 15 extend vertically through the side walls at spaced intervals and the spaces between the vertical corner timbers 7 and the side wall timbers 15 are packed with any suitable thermal insulating material 17 such as Celotex, cork, glass wool, metallated wool or the like.

As shown more clearly in Fig. 1, the floor of the cabinet comprises a lower floor 19 and an upper floor 21 of boards separated by cross boards 23 and having the spaces therebetween packed with the insulation material 17. The sheet metal liners 11 and 13 extend over the outside and the inside of the floor of the cabinet. Cleats or wooden strips 25 are placed on the floor of the cabinet at spaced intervals to support the milk cans 5 while permitting the cooling liquid to circulate freely thereunder. The upper wall of the cabinet is provided with a closure member or door 27 which is pivotally secured to one side of the cabinet by suitable hinges 29. The closure is conveniently opened, by means of a handle 31 provided on the opposite side thereof, for the insertion and removal of milk cans.

A partition 33, which is vertically disposed in the cabinet, extends transversely across adjacent one end for dividing off a chill chamber 35. The partition 33 may be of any suitable sheet metal having laterally bent edges 37 for abutting the inside liner 11 to which it may be secured in any suitable manner, as by soldering for example. The partition 33 is suitably selected and positioned so that the top edge thereof is slightly lower than the lowest level of the cooling water or other liquid in the cooling tank 3 when there are no milk containers therein, so that the cooling liquid will then continue flowing and circulating over the partition.

An overflow pipe 38 is mounted vertically in one corner of the tank 3 passing downwardly through the floor for connection with a drain. The upper open end of the overflow pipe 38 is at a suitable level to drain excessive cooling fluid from the tank 3.

A refrigerated open-type cooling element, such as a finned coil 39, is mounted in the chill chamber 35 in a suitable position for passing cooling liquid therethrough in intimate heat exchange relation as it flows from the cooling tank over the partition 33 into the chamber. For this purpose the finned refrigerated coil 39 is preferably mounted in a horizontal position in the chill chamber 35 between the partition 33 and the end of the cabinet. The level of the finned coil 39 may be slightly below the upper edge of the partition 33. One end of the refrigerated coil 39 is connected to a usual refrigerant regulating valve 41.

From the other end of the refrigerated coil 39 a conduit 43 extends through the top wall of the cabinet to the suction side of a refrigerant compressor unit 45 which is mounted on top of the cabinet. For this purpose any suitable compressor unit may be used, for example such as the compact sealed-in unit 45 of conventional construction shown mounted on the top wall of the cabinet by brackets 47. From the high pressure side of the unit a pipe 48 connects into the upper end of a condenser 49 of conventional construction, such as a finned coil, for dissipating the heat to the surrounding atmosphere. For circulating air through the condenser 49, a fan 51 is mounted adjacent thereto on the extended end of a shaft of a small motor 53 which may be mounted on the top wall of the cabinet. From the lower end of the condenser coil 49 a small pipe 55 passes down through the top wall of the cabinet and connects into the automatic refrigerant regulating valve 41 which automatically regulates the proper supply of condensed refrigerant to the finned cooling coil 39 in the chill chamber 35 in a well known manner.

To circulate the chilled cooling liquid from the chill chamber 35 to the cooling tank 3, a motorized sump-type pump 57 is provided which is mounted on the cabinet with the motor 59 above the top wall, the pump shaft 61 and enclosing tube 63 passing down through the top wall into the chill chamber where the pump 65 is mounted adjacent the floor for drawing up the chilled liquid flowing downwardly through the finned coil. Such sump pumps usually have a guard ring 67 projecting downwardly and this guard preferably rests on the floor of the cabinet. There are various sump pumps of this type available on the market which are compact units very suitable for this purpose. A baffle plate 69 of sheet metal is provided surrounding the shaft tube 63 of the motor and extending between the partition 33, the adjacent end of the chill coil 39 and the side walls of the cabinet for diverting the cooling liquid flowing over the top of the partition to flow down through the cooling coil. The marginal edges of the baffle may be turned to provide lateral flanges 71 for attachment to the partition and the liner of the cabinet. The refrigerant regulation valve 41 is preferably mounted upon the upper side of the baffle plate 69 which serves as a rigid support therefor.

For delivering the chilled cooling liquid from the pump 65, a conduit 73 connects from the discharge outlet thereof and passes upwardly through a three-way valve 75 into a T connection 77. From the T fixture 77 two pipes 79 branch off to opposite sides of the tank extending along the side walls to the rear portion of the tank where the chilled liquid is discharged. The pipes 79 are secured to the inside liner 11 of the tank in any suitable manner as by brackets 81 sweat soldered thereto. From the other port of the three-way valve 75 an outside connection conduit 83 extends projecting externally through the top wall of the cabinet. The externally projected end of the connection pipe 83 is suitably threaded to provide a convenient connection for coupling with any hose or other conduit means for delivering chilled cooling liquid for cooling milk directly in any suitable milk cooling apparatus such as a conventional counter-flow heat exchanger or the like (not shown) which may be mounted on or adjacent to the cabinet the cooling liquid being then returned to the tank in the cabinet, for recirculation through the fins of the cooling unit 39.

When the three-way valve 75 is turned to one position, for example vertically as shown, the outside connection is closed and the liquid is returned to the tank 3 through the side pipes 79. When the three-way valve 75 is turned to the alternate position, the connection to the tank side pipes 79 is closed and the chilled cooling liquid is delivered through the outside connection 83. This arrangement is also useful for supplying water under pressure in locations where tap water is not available. For this purpose the refrigerant compressor 45 may not be operated. For cooling purposes, the electric motor of the compressor unit 45 is preferably controlled automatically by any conventional thermostatic switch (not shown) which is preferably mounted in the tank for this purpose. The motor 59 of the pump is for this purpose preferably connected in parallel with the compressor motor for simultaneous automatic control by the same thermostatic switch, suitable manual switch means being preferably provided for also controlling the pump motor separately in a convenient manner, as will be readily understood by those skilled in the art. A suitable shield or guard 87 of open work grill or screen construction is preferably provided on top of the cabinet to house the pump motor and the refrigerant compressor apparatus.

In operation, the milk cans being placed in the cooling tank in the cabinet the heat is absorbed by the cooling liquid. The warmed cooling liquid in the tank rises and flows over the top of the partition 33 into the chill chamber 35 where it flows downwardly through the finned cooling coil 39 to the bottom of the chamber. The pump 65 then receives the chilled cooling liquid and returns it to the cooling tank at a high level in the rear portion thereof. In this manner of operation high thermal efficiency is obtained with a minimum of congealing of the cooling water, or other cooling liquid, on the cooling coils. It will be seen that I have provided a simple compact cooling unit which is also conveniently adapted for supplying chilled cooling liquid externally through the outside connection for other purposes, or for supplying water under pressure where regular tap water is not available.

It is apparent that within the scope of my invention, modifications and different arrangements may be made other than herein disclosed, and the present disclosure is illustrative merely, the invention comprehending variations thereof.

I claim:

1. A mechanical milk cooler comprising, a heat insulating cabinet enclosing a milk cooling tank, partition means disposed in said cabinet for dividing off a chill chamber, said partition means being suitably selected and positioned so that the top edge thereof is slightly lower than the desired level of cooling liquid in said cooling tank so that the cooling liquid continues flowing over the partition and circulating when there are no milk containers therein, an open-type cooling element suitably disposed in said chill chamber for passing cooling liquid therethrough in intimate heat exchange relation as it flows from the cooling tank over the top of said partition into the chill chamber, conduit means connecting from the chill chamber to said cooling tank and comprising branches extending to the upper portion at opposite sides of the tank, and liquid impelling means for moving the chilled cooling liquid from the bottom of the chill chamber through said conduit means into the cooling tank.

2. A mechanical milk cooler comprising, a heat insulating cabinet enclosing a milk cooling tank, a partition disposed vertically in said cabinet adjacent one end thereof for segregating a chill chamber, said partition being of suitable dimensions and suitably positioned so that the top edge thereof is slightly lower than the lowest level of the cooling liquid in the cooling tank so that circulation continues when there are no milk containers therein, a finned refrigerant cooled coil mounted horizontally in said chill chamber between said partition and the end of the cabinet for passing cooling liquid therethrough in intimate heat exchange relation as it flows from the cooling tank over the partition into the chamber, a motorized sump-type pump mounted on said cabinet with the motor above the top wall thereof and the pump disposed in the bottom of said chill chamber to be immersed in the chilled cooling liquid flowing through the cooling element into the chamber, baffle means surrounding the shaft of said sump pump between the partition and the end of the cabinet for diverting the down flowing cooling liquid through the cooling coil, and conduit means extending from the sump pump for delivering chilled liquid to the remote end of the cooling tank into the upper portion thereof.

3. A mechanical milk cooler comprising, a heat insulating cabinet enclosing a milk cooling tank, a partition disposed vertically across one end of said cabinet for dividing off a chill chamber, said partition being suitably selected and positioned so that the top edge thereof is slightly lower than the lowest level of the cooling liquid in said cooling tank so that circulation of the cooling liquid continues when there are no milk containers therein, an open-type cooling element suitably disposed in said chill chamber for passing cooling liquid therethrough in intimate heat exchange relation as it flows from the cooling tank over the top of said partition into the chill chamber, a motorized sump pump mounted on said cabinet with the motor above the top wall thereof and the pump adjacent the bottom of said chill chamber for drawing chilled liquid therefrom, and conduit means connecting from said pump and arranged for delivering chilled cooling liquid into the upper portion of said tank at a plurality of points.

4. A mechanical milk cooler comprising, a heat insulating cabinet enclosing a milk cooling tank, partition means disposed in said cabinet for segregating a chill chamber, said partition being of suitable dimensions and suitably positioned so that the top edge thereof is slightly lower than the desired level of the cooling liquid in the cooling tank to continue the circulation thereof when there are no milk-containers therein, a refrigerant cooled open-type cooling element mounted in said chill chamber for passing cooling liquid therethrough in intimate heat exchange relation as it flows from the cooling tank over the partition into the chamber, a motorized sump-type pump mounted on said cabinet with the motor above the top wall thereof and the pump disposed in the bottom of said chill chamber to be immersed in the chilled cooling liquid flowing through the cooling element into the chamber, conduit means extending from the sump pump for delivering chilled liquid, and said conduit means comprising two divided branches extending to the remote end of the cooling tank into the upper portion on both sides thereof.

NICHOLAS ACHS.